United States Patent [19]

Mizuno et al.

[11] Patent Number: 4,592,949
[45] Date of Patent: Jun. 3, 1986

[54] VINYLIDENE FLUORIDE RESIN SPLIT YARN, PROCESS FOR PRODUCTION THEREOF AND FILTER COMPRISING THE SAME

[75] Inventors: Toshiya Mizuno; Yoshikichi Teramoto; Naohiro Murayama, all of Iwaki, Japan

[73] Assignee: Kureha Kagaku Kogyo Kabushiki Kaisha, Tokyo, Japan

[21] Appl. No.: 732,432

[22] Filed: May 6, 1985

[30] Foreign Application Priority Data

May 7, 1984 [JP] Japan .................................. 59-89498
May 7, 1984 [JP] Japan .................................. 59-89499

[51] Int. Cl.$^4$ ............................................. D03D 3/00
[52] U.S. Cl. ............................... 428/224; 55/DIG. 45; 428/229; 428/364; 428/392; 428/394; 428/910
[58] Field of Search ............... 428/224, 229, 364, 392, 428/394, 910

[56] References Cited

U.S. PATENT DOCUMENTS 4,298,719 11/1981 Mizuno et al. ..................... 428/910

Primary Examiner—James J. Bell
Attorney, Agent, or Firm—Wenderoth, Lind & Ponack

[57] ABSTRACT

A vinylidene fluoride resin having an inherent viscosity of 0.8 to 1.4 dl/g in dimethylformamide is melt-extruded and cooled and solidified under draft-stretching to form a film having a birefringence of $25 \times 10^{-3}$ or larger. The film is heat-treated at 80°–120° C. and split into a split yarn. The split yarn has a Young's modulus even higher than that of the polypropylene split yarn and, when provided with a surface charge above the glass transition temperature, retains the charge semi-permanently. The charged split yarn is particularly suitable for forming a gas filter.

10 Claims, 2 Drawing Figures

VINYLIDENE FLUORIDE RESIN SPLIT YARN, PROCESS FOR PRODUCTION THEREOF AND FILTER COMPRISING THE SAME

BACKGROUND OF THE INVENTION

The present invention relates to a split yarn of a vinylidene fluoride resin, a process for production thereof and a filter comprising the split yarn.

From a vinylidene fluoride resin, a filament yarn which is made of continuous fiber has been commercially produced, whereas a split yarn or slit yarn which is made of staple form fiber has not been commercially produced.

Not only from a vinylidene fluoride resin, but also from many other resins, it is difficult to obtain a split yarn. A polypropylene yarn which is obtained by cold-stretching a polypropylene film at a high stretching ratio of around 10 times and splitting the stretched film has been known as a split yarn. However, no split yarn has been obtained in a similar manner from any other resin. This may be attributable to the fact that polypropylene has a high crystallinity and also has a weak cohesion strength so that the above described process is readily applicable thereto. For this reason, it has been considered difficult to obtain a split yarn from a vinylidene fluoride resin which has a low crystallinity and a larger intermolecular cohesion strength by the splitting process as described above.

A vinylidene fluoride resin however is a polar polymer and has a weather resistance and a chemical resistance which are essentially better than those of polypropylene. Accordingly, if a split yarn thereof can be obtained, it is expected be a useful functional material. Especially, if the split yarn of a vinylidene fluoride resin is obtained in an electrically charged state, it would be an excellent filter material retaining its charge stably.

SUMMARY OF THE INVENTION

A principal object of the present invention is, in view of the above circumstances, to provide a split or slit yarn of a vinylidene fluoride resin and a process for producing the same.

Another object of the present invention is to provide a charged split yarn and a filter comprising the same.

According to our study, it has been discovered that a split yarn of a vinylidene fluoride resin can be obtained if a vinylidene fluoride resin having an appropriate molecular weight is processed under appropriate conditions, and the thus obtained vinylidene fluoride resin split yarn has characteristic crystal melting point and crystal size.

The split yarn of a vinylidene fluoride resin according to the present invention is based on the above discovery and more specifically characterized by:

(a) having a crystal melting point of 182° C. or higher as measured at a temperature elevation speed of 10° C./minute in nitrogen atmosphere by a differential scanning calorimeter, and (b) comprising crystals giving an average crystal width of 200 Å or larger.

The process for producing a split yarn of a vinylidene fluoride resin, comprises the steps (a)–(d) in the order named:

(a) melt-extruding a vinylidene fluoride resin into a sheet or tube, said vinylidene fluoride resin having an inherent viscosity of 0.8 to 1.4 dl/g as measured in a dimethylformamide solution at a concentration of 0.4 g/dl at 30° C., (b) cooling and solidifying the extruded sheet or tube under draft-stretching to form a film having a birefringence of $25 \times 10^{-3}$ or larger, (c) heat treating the film at a temperature of from 80° to 180° C., and (d) splitting the film into a split yarn.

Furthermore, a charged split yarn is obtained by applying an electric voltage to the film at any point from after the step (b) to after the step (c) at a temperature which is not lower than the glass transition temperature but is lower than the melting point of the principal constituent resin of the vinylidene fluoride resin. The filter according to the invention is constituted by a gathering of the charged split yarns.

These and other objects, features and advantages of the present invention will become more apparent upon a consideration of the following description concluding with specific examples and comparative examples taken in conjunction with the accompanying drawings.

DETAILED DESCRIPTION OF THE INVENTION

Figure 1:
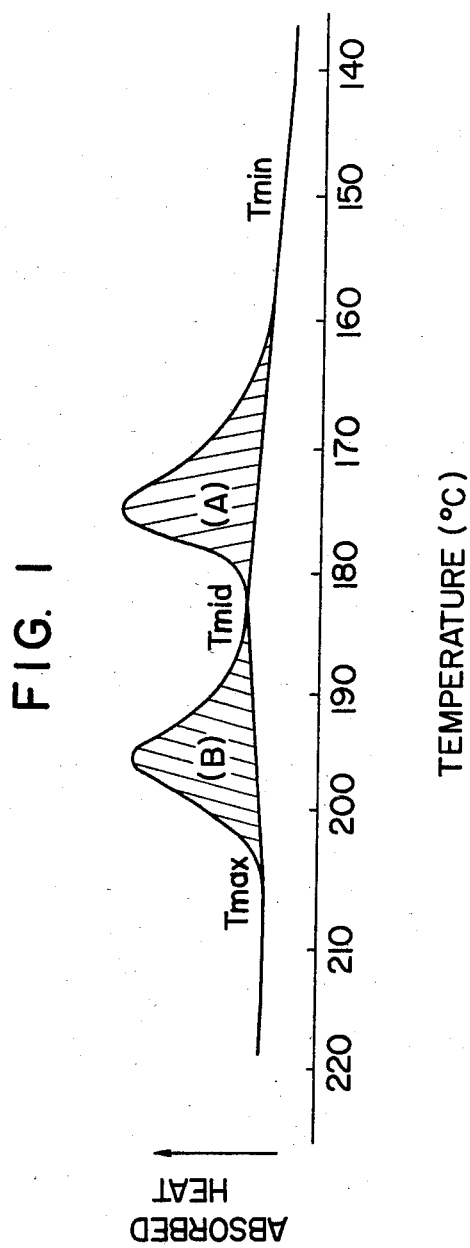
FIG. 1 shows an example of melting curve obtained by a differential scanning calorimeter measurement.

The term "vinylidene fluoride resin" used herein for describing the present invention is intended to cover a vinylidene fluoride homopolymer; a vinylidene fluoride copolymer comprising as the constituent units thereof 70 mol. % or more of vinylidene fluoride and one or more monomer copolymerizable therewith such as ethylene, vinyl fluoride, trifluoroethylene, tetrafluoroethylene, trifluorochloroethylene, and hexafluoropropylene; and a vinylidene fluoride resin composition comprising 80 wt. % or more thereof, of such a vinylidene fluoride homopolymer or copolymer. Examples of the components other than the vinylidene fluoride homopolymer or copolymer include other polymers and additives such as plasticizers, processing aids and ultraviolet absorbers. Examples of the above-mentioned other polymers include polyethylene, polypropylene, polyvinyl acetate, polymethyl methacrylate, polyethyl methacrylate, polystyrene, aliphatic acid polyesters, aromatic polyesters, polyamides, and fluoride-containing polymers other than vinylidene fluoride homopolymer or copolymer.

In the present invention, the vinylidene fluoride resin, among the above enumerated examples thereof, should preferably be a vinylidene fluoride homopolymer or a copolymer of vinylidene fluoride with a perfluoroolefin, particularly a copolymer of vinylidene fluoride with tetrafluoroethylene, comprising 70 mol. % or more, particularly 80 mol. % or more, of vinylidene fluoride units.

The split yarn of the vinylidene fluoride resin according to the present invention is characterized by having a crystal melting point of approx. 182° C. or higher as measured on heating at a temperature elevation speed of 10° C./min. in nitrogen atmosphere by means of a differential scanning calorimeter (hereinafter abbreviated as "DSC"). The crystal melting point is mainly determined at a stage after the draft-stretching step in the process for production of the split yarn. Herein the crystal melting point refers to a temperature giving a heat absorption peak in a melting curve obtained by the DSC measurement.

A split yarn can be produced more easily from such a resin that has a larger proportion of the heat absorption area based on the melting heat absorption peak of 182° C. or higher occupied in the total area of the heat absorption peaks on the DSC chart. For example, a film of such a resin is more easily split to form a split yarn having a larger Young's modulus. For this reason, the proportion of the heat absorption area based on the melting heat absorption peak of 182° C. or higher in the total area of heat absorption in the DSC chart should preferably be 20% or more, more preferably 50% or more, further more preferably 80% or more.

For the same reason, it is preferred that the resin constituting the film has a crystal melting point at a higher temperature, preferably 185° C. or higher, more preferably 190° C. or higher. Besides, in the heat absorption area on the DSC chart, the proportion occupied by the heat absorption area based on the melting heat absorption peak of these temperatures or higher should preferably be as high as possible, especially as explained above with reference to the peak of 182° C. or higher.

The base line for calculating the heat absorption area in the DSC measurement chart is determinned as follows.

First, a sample to be measured is elevated in temperature to 220° C. under the conditions as already described to determine the melting curve of the sample. Then, after maintained at 220° C. for 30 seconds, the sample is lowered in temperature at a rate of 10° C./min. to be crystallized and cooled to room temperature. The thus obtained melted and recrystallized product is again elevated in temperature under the same conditions to determine the crystal melting curve. The first end point of crystal melting of the melting curve obtained, namely the point when the heat generation peak has completed ($T_{mid}$), is determined. (See FIG. 1 obtained in an Example described hereinafter.)

The melting peak in the melting curve of the measured sample is divided at this point $T_{mid}$, while both the ends on the maximum temperature side and the minimum temperature free of any heat absorption or evolution in the melting curve are respectively connected to the point $T_{mid}$ to define a baseline. The positions of both ends of no heat absorption or evolution are determined by overlapping the DSC measurement chart obtained under the state where no sample is contained, following otherwise entirely the same conditions.

Another specific feature of the split yarn of the present invention is that it comprises crystals giving an average crystal width of the order of 200 Å or larger, ordinarily within the range of 250 to 300 Å. Herein, the average crystal width can be determined by X-ray diffraction. Thus, a mass of a split yarn is arranged generally in the direction of draft (stretching direction) and hardened with an amorphous adhesive to form a sample in the form of a film. The sample is placed so that its draft direction is arranged longitudinally. An X-ray is incident on the film and the intensity of reflection at the film surface, i.e., diffraction intensity, of the X-ray in the horizontal direction is recorded on a chart. When the average crystal width is obtained from the chart thus obtained, a diffraction peak of the (110) plane is noted.

Thus, the diffraction intensity of the (110) plane is read on the chart to determine the half-value width of the peak. On the other hand, by use of silicon single crystal powder, the mechanical expansion (namely, expansion of the diffraction peak inherent in the measuring machine) is determined. The value obtained by subtracting the half-value width of the mechanical expansion from the half-value width of the measured sample is determined as the true half-value width ($\beta w$ (radian)) of the sample. By use of the true half-value width, the crystal length (L) is determined from the Scherrer's equation:

$$L = (k \cdot \lambda)/(\beta w \cdot \cos\theta)$$

where $\theta$ is the Bragg reflection angle of the measured diffraction plane (i.e., the (110) plane), k is a constant (=1.0), and $\lambda$ is the wavelength of X-ray CuK$\alpha$ (1.542Å). (As to details of such a measuring method, see, for example, "Basis of X-ray crystallography", translated by Hirabayashi and Iwasaki, Maruzen (published on Aug. 30, 1973), p. 569.) The measured values described herein are those obtained by means of an X-ray diffraction device produced by Rigaku Denki K.K. at a voltage of 40 KV and a current of 20 mA, with a slit system under the conditions of a divergence split of 1°, a receiving slit of 0.3 mm in diameter and a scattering slit of 1° and at a scanning speed of $2\theta = 1°$/min. The X-ray is also monochromatized with an Ni filter.

The above described split yarn of a vinylidene fluoride resin according to the present invention may, for example, be produced in the following manner.

First, a vinylidene fluoride resin having an inherent viscosity of 0.85 to 1.4 dl/g as measured as a dimethylformamide solution at a concentration of 0.4 g/dl at 30° C. is melt-extruded into a sheet or tube. If the inherent viscosity is lower than the above mentioned range, irregularity in thickness of the extrudate occurs during the draft-stretching as will be described hereinafter so that a high draft ratio cannot be attained to result in decrease in mechanical strength. On the other hand, if the inherent viscosity exceeds the above mentioned range, the extrusion and processing of the vinylidene fluoride resin becomes difficult and, if the resin is processed at a high temperature, it is liable to decompose thermally. Preferably, a resin having an inherent viscosity according to the above definition in the range of 0.9 to 1.3 dl/g, particularly 1.0 to 1.2 dl/g is used.

The melt-extrusion may be carried out according to a known process such as the T-die process or the inflation process. The resin may preferably be first extruded through a circular inflation die and then formed into a film by the inflation process. This is because the T-die process is not desirable as it causes a large degree of shrinkage in width so that both sides of the film cannot be sufficiently oriented during the subsequent stretching at a high draft ratio.

After the melt-extrusion, the extrudate is, as it is, draft-stretched at a high draft ratio and simultaneously cooled to solidify into a film. The draft ratio at this stage is so selected as to provide a film having a birefringence of $25 \times 10^{-3}$ or larger after cooling and solidification.

Figure 2:
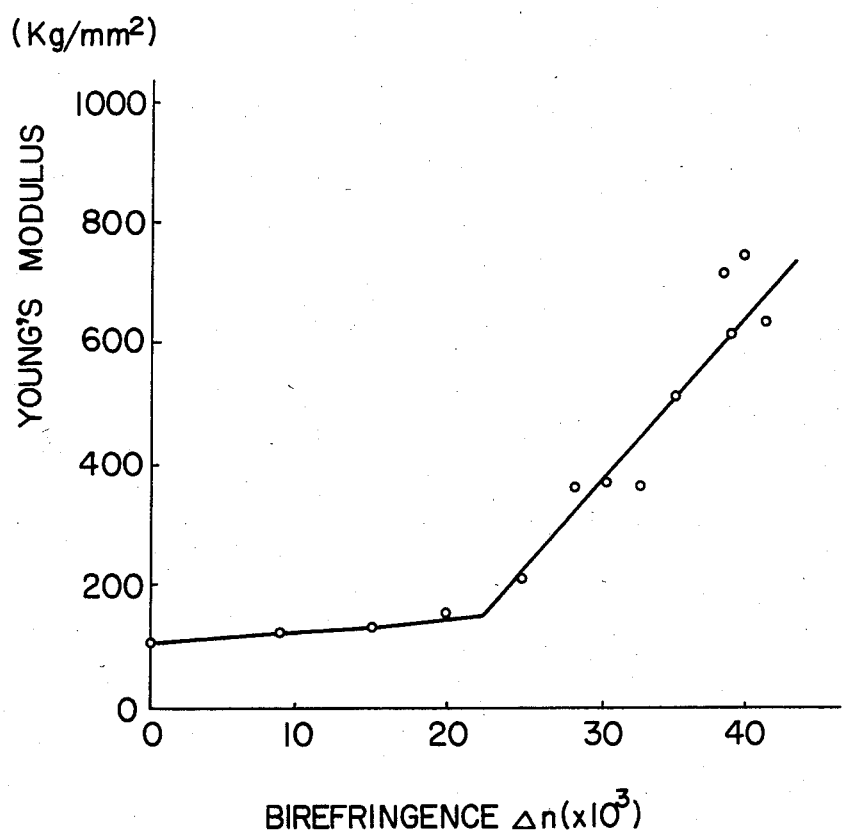
FIG. 2 is a graph showing a relationship between Young's modulus and birefringence for explaining draft stretching.

This is explained in rather detail hereinbelow. A highly molecular-oriented film can be obtained by first melt-extruding the vinylidene fluoride resin and then taking up the extruded film at a certain high draft ratio while using a pinch or guide roller having a temperature below the fastest crystallization temperature (i.e., the temperature giving the maximum crystallization speed) of the principal resin (i.e., a resin having the largest content) constituting the vinylidene fluoride resin and placed at an environmental temperature below the fastest crystallization temperature. At this time, the draft ratio can vary depending on such factors as a melt-viscosity of the resin, environmental temperature and a volume rate of cooling air, but it is set at such a high level as to give a film having a birefringence $\Delta n$ of approx. $25 \times 10^{-3}$ or larger. The thus taken-up film having a large birefringence comprises crystals having a high melting point as high as 182° C. or higher, as different from a film having a smaller birefringence, and also has a remarkably increased Young's modulus as shown in FIG. 2, which shows a relationship between $\Delta n$ and Young's moduli for films which were obtained by melt-extruding a vinylidene fluoride homopolymer having an inherent viscosity of 1.1 dl/g through a circular die of 50 mm in diameter and 2 mm in lip-clearance, inflating the extrudate at a blow-up ratio of 1.2 and taking it up at various take-up speeds. Herein, the operation of taking up a film at a draft ratio exceeding such a critical draft ratio above which the Young's modulus of a product film abruptly increases is referred to as "draft-stretching".

The appropriate draft ratio depends on the melt viscosity of a resin but is ordinarily of the order of 50 to 5000. When the melt viscosity of a resin is low, a birefringence of $25 \times 10^{-3}$ or larger for a cooled and solidified film cannot be obtained unless the draft ratio is relatively increased. The draft ratio is preferably so set as to give a birefringence of $30 \times 10^{-3}$ or lager, particularly $35 \times 10^{-3}$ or larger. This is because the splitting as described hereinafter is easily carried out.

When the inflation process is adopted, a blow-up ratio which is a stretching ratio in the transverse direction should appropriately be selected in addition to the draft ratio. The blow-up ratio is ordinarily in the range of 0.7 to 2.5, and preferably in the range of 0.8 to 1.5.

The cooling for solidification is conducted in a known manner. For example, in the inflation process, a film may be extruded upwardly and cooled by air, or may be extruded downwardly and cooled with a cooling medium such as water as a typical example.

The thus obtained film is heat-treated at a temperature of preferably 80° to 180° C. The heat treatment is carried out in order to promote crystallization and is effectively carried out around the fastest crystallization temperature of the principal resin constituting the vinylidene fluoride resin. Thus, the heat treatment is carried out at a temperature which is not lower by 60° C. and not higher by 60° C. than the fastest crystallization temperature, more preferably at a temperature which is not lower by 40° C. and not higher by 40° C. than the fastest crystallization temperature.

The time for the heat treatment is preferably as long as possible and is ordinarily at least 2 hours, more preferably 24 hours or longer, at around the fastest crystallization temperature.

The film is not necessarily placed under a constant length state but is preferably placed under a constant length state during the heat treatment. By the heat treatment, the crystalline structure of the vinylidene fluoride resin constituting the film is transformed from one predominantly of the $\alpha$-phase to one predominantly of the $\gamma$-phase.

After or simultaneously with the heat treatment, the film is preferably cold-stretched to transform the crystalline structure to one predominantly of the $\beta$-phase, because the film is caused to have a higher elasticity and can be formed into a split yarn more easily thereby. The stretching ratio at this time may be of the order of 1.1 to 5 times.

The thus obtained film is split into a split yarn comprising thin fibrillated strips each having a rectangular section with an average shorter side length of 1 to 10 microns and an average longer side length of 2 to 100 microns. The splitting of the film can be effected by using a roller around which needles are planted as disclosed in Japanese Patent Laid-Open Application No. 180621/1983 and by causing the needle-planted roller to rotate along the movement of the film and contact the film while rotating.

The thus obtained split yarn may have a Young's modulus larger than that of a known polypropylene split yarn. This is amazing in view of the fact that the known filament of polyvinylidene fluoride has a Young's modulus smaller than that of the polypropylene filament. Further, the split yarn thus obtained according to the present invention retains excellent features such as excellent weatherability and chemical resistance which are inherent to known vinylidene fluoride resins and are not attained by the polypropylene split yarn.

The split yarn according to the present invention may be provided with a surface charge. Herein, the surface charge of a split yarn does not mean that the split yarn has a temporary surface charge but means that it has a semi-permanent surface charge. More specifically, the presence or absence of a surface charge is determined in the following manner. Thus, a sample split yarn is formed into woven or nonwoven cloth in a size of 10 cm $\times$ 10 cm, which is then placed in an environment of 23° C. and 50% humidity for 24 hours. The surface potential of the sample cloth is measured under the same environmental conditions by means of a rotating sector type surface potentiometer. The presence or absence of a surface charge is judged by whether the arithmetic mean of 5 measured surface potentials for 5 sheets of such sample cloth is above 1 V or not.

Such a split yarn of a vinylidene fluoride resin having a surface charge is more excellent in dust-removal effect based on a surface charge when compared with a polypropylene split yarn having a surface charge and is particularly suitably used for a filter for removing dust, smoke of cigarette, etc., in air. A filter otained from the split yarn is not limited to such an air filter. Thus, the filter is not only applicable for treatment of air but also suitably applicable for any fluid assuming the form of gas or mist at the time of treatment, particularly any kinds of gas. Furthermore, the filter may also be applicable for a nonpolar liquid.

The split yarn of a vinylidene fluoride resin of the present invention having a surface charge as mentioned above may be produced by applying a voltage to a film of a vinylidene fluoride resin at an appropriate stage during the above described process for producing a split yarn. The application of a voltage is carried out at any time from after the step of draft-stretching and cooling for solidification to before the splitting step, i.e., before, simultaneously with, during or after the heat-treatment step, preferably at a temperature not lower than the glass transition temperature of and below the melting point of the principal resin constituting the vinylidene fluoride resin. The voltage is applied in the direction of thickness of the film at an intensity of 50 KV/cm or higher and below the dielectric breakdown intensity. The application of a voltage is carried out for imparting a surface charge to the split yarn. Therefore, while the voltage may be applied during the progress of crystallization or after almost complete crytallization in the film, it may preferably be carried out after the heat-treatment step or started from an intermediate point during the heat-treatment step. However, it is not appropriate to apply the voltage to a split yarn for the purpose of effective provision of the surface charge because a high electric voltage cannot be applied thereto due to a low withstand voltage of air in a gap between strips of the yarn.

The temperature for the voltage application should preferably be within the range of from the lower limit of the glass transition temperature of the principal resin constituting the vinylidene fluoride resin to the upper limit of the melting point thereof. More specifically, the temperature is preferably within the range of from room temperature to 150° C., more preferably from room temperature to 120° C. The voltage may be applied to the film either while the electrodes contact both surfaces of the film or while the electrodes are spaced apart from both surfaces with a small gap, i.e., by a corona polarization or discharge treatment. When the voltage is continuously applied to the film, the corona treatment is preferred. In either method, a time of several seconds to several tens of seconds is sufficient for the voltage application. The above range of time is preferred because a longer time may be applied with no trouble but will lower the productivity.

The filter of the present invention can be obtained by gathering the thus obtained split yarn into a form adapted for cleaning of a fluid to be treated such as a cloth including a woven and nonwoven cloth or a packing material inserted in a stream path.

As described hereinabove, according to the present invention, a split yarn of a vinylidene fluoride resin which has not been obtained heretofore is provided by treating a vinylidene fluoride resin having an appropriate molecular weight through a combination of specific steps. The thus obtained split yarn may have not only superior weatherability and chemical properties such as chemical resistance but also have a larger Young's modulus than the polypropylene split yarn which has been substantially the sole split yarn obtained from a synthetic resin. Furthermore, as the vinylidene fluoride resin per se is a polar polymer, a surface charge is extremely stably retained on the split yarn, from which there is formed a filter excellent in effect of removing fine charged particles from various fluids represented by air.

The present invention will be explained more specifically hereinbelow with reference to Examples and a Comparative Example.

EXAMPLE 1

A vinylidene fluoride homopolymer obtained by suspension polymerization at 25° C. and having an inherent viscosity of 1.1 dl/g as measured in a 0.4 g/dl solution in dimethylformamide at 30° C., was melt-extruded upwardly by means of an extruder with a circular die of 50 mm in diameter and 3.0 mm in lip clearance at an extrusion temperature of 240° C. and at an extrusion rate of 60 g/min. The extruded tube was inflated at a blow-up ratio of 1.5 while blowing air for cooling at a rate of 0.01 $m^3$/min. from an air-ring about 10 cm above the die, and taken up at a rate of 50 m/min., namely at a draft ratio ($R_1$) of 670, whereby a film having a birefringence of $36 \times 10^{-3}$ was obtained.

The thus inflated film was taken up about a paper tube core and heat-treated as it was at 90° C. for 2 days in a gear oven. The film gave an average crystal width of 320 Å as determined by X-ray diffraction. Further, the film was subjected to a DSC measurement at a temperature elevation rate of 10° C./min. in order to evaluate the crystal melting behavior, whereby two peaks of crystal melting points were observed at 175° C. and 195° C., and the heat absorption area given by the melting heat absorption peak at 195° C. occupied 50% of the total heat absorption area.

The film thus heat-treated was further stretched at 150° C. at a rate of 1.3 times. The film was further split by a needle-planted splitter to obtain a finely divided split yarn. The split yarn gave an average crystal width and a melting heat absorption curve substantially the same as those obtained with respect to the film thereof as explained above.

The split yarn was estimated to have a Young's modulus of above 500 kg/$mm^2$ which was the value obtained with respect to the film before splitting because it showed substantially no change in crystal structure before and after the splitting.

EXAMPLE 2

The film after the step of stretching in Example 1 was subjected to a corona polarization treatment by means of a corona polarization apparatus with upper needle electrodes and lower needle electrodes between which the film was moved at a position about 5 mm spaced apart respectively from the upper and lower needle electrodes under the application of a voltage of 1.5 KV.

The thus stretched and corona-treated film was split by means of a needle-planted splitter to obtain a charged split yarn comprising finely divided strips having an average length of 20 cm and a section measuring 3 microns in average shorter side length and 15 microns in average longer side length.

EXAMPLE 3

The charged split yarn was formed into a nonwoven cloth of 0.05 g/$cm^2$, which was inserted in and placed at a mid point of a glass tube having a diameter of 30 mm and a length of 20 cm. The glass tube was placed in front of a commercially available electric fan so that one end of the tube was 30 cm spaced apart from the fan and smoke of cigarette together with wind was blown into the tube. The concentration of the smoke was observed before and after the nonwoven cloth, whereby almost no smoke was observed in the tube after the cloth.

COMPARATIVE EXAMPLE

The cleaning test in Example 3 was repeated by using a nonwoven cloth filter of an isotactic polypropylene split yarn having an average length of 20 cm and a section with an average shorter side length of 3 microns and an average longer side length of 15 microns, whereby the concentration of the smoke was observed to be only slightly thinned after the filter, showing apparently poorer results, when compared with those obtained by using a split yarn of a vinylidene fluoride resin.

What is claimed is:

1. A split yarn of a vinylidene fluoride resin characterized by:

(a) having a crystal melting point of 182° C. or higher as measured at a temperature elevation speed of 10° C./minute in nitrogen atmosphere by a differential scanning calorimeter, and (b) comprising crystals giving an average crystal width of 200 Å or larger.

2. The split yarn according to claim 1, which has a surface charge.

3. The split yarn according to claim 1, which has a proportion of heat absorption area based on the crystal melting point of 182° C. or higher to the total heat absorption area of 20% or more on a chart of the differential scanning calorimeter measurement.

4. The split yarn according to claim 1, which comprises vinylidene fluoride homopolymer, or a copolymer of vinylidene fluoride and a monomer copolymerizable therewith comprising at least 70 mol. % of vinylidene fluoride units.

5. The split yarn according to claim 4, wherein the vinylidene fluoride homopolymer or copolymer has an inherent viscosity of 0.8 to 1.4 dl/g as measured in dimethylformamide at a concentration of 0.4 g/dl at 30° C.

6. The split yarn according to claim 4, wherein the vinylidene fluoride homopolymer or copolymer predominantly comprises $\beta$-phase crystals.

7. The split yarn according to claim 1, which comprises strips of the vinylidene fluoride resin having a section with an average shorter side length of 1-10 microns and an average longer side length of 2-100 microns.

8. A filter comprising a gathering of the split yarn according to claim 2.

9. The filter according to claim 8, which comprises a woven or nonwoven cloth of the split yarn.

10. The filter according to claim 8, which comprises a mass of the split yarn.

* * * * *